US008718419B2

(12) United States Patent  
Diatzikis et al.

(10) Patent No.: US 8,718,419 B2
(45) Date of Patent: May 6, 2014

(54) FRAME FOOT LOADING MEASUREMENT SYSTEM USING FIBER OPTIC SENSING TECHNIQUE

(75) Inventors: Evangelos V. Diatzikis, Chuluota, FL (US); Jonathan R. Anderson, Winter Park, FL (US); David A. Reed, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 80 days.

(21) Appl. No.: 13/585,888

(22) Filed: Aug. 15, 2012

(65) Prior Publication Data

US 2014/0047926 A1    Feb. 20, 2014

(51) Int. Cl.
G02B 6/00 (2006.01)
G01D 5/353 (2006.01)
G01B 11/16 (2006.01)
G02B 6/02 (2006.01)

(52) U.S. Cl.
CPC ............... G01D 5/353 (2013.01); G01B 11/16 (2013.01); G02B 6/02085 (2013.01); G02B 6/022 (2013.01)
USPC ................... 385/12; 385/13; 385/37; 73/705

(58) Field of Classification Search
CPC ........ G01D 5/353; G01B 11/16; G01B 11/18; G02B 6/02085; G02B 6/02195; G02B 6/011; G02B 6/02204
USPC ................... 385/12, 13, 37; 73/705
See application file for complete search history.

(56) References Cited

U.S. PATENT DOCUMENTS

| 6,490,931 | B1 * | 12/2002 | Fernald et al. ................... 73/705 |
| 6,586,722 | B1 * | 7/2003 | Kenny et al. ............. 250/227.16 |
| 6,636,041 | B2 * | 10/2003 | Arz et al. ..................... 324/322 |
| 6,807,325 | B1 | 10/2004 | Kraemmer et al. |
| 6,923,048 | B2 | 8/2005 | Willsch et al. |
| 7,379,632 | B1 | 5/2008 | Twerdochilb |
| 8,433,160 | B2 * | 4/2013 | Shah et al. ..................... 385/12 |
| 2010/0066315 | A1 | 3/2010 | Diatzikis et al. |
| 2012/0279313 | A1 * | 11/2012 | Diatzikis et al. ................ 73/861 |

OTHER PUBLICATIONS

Vincent P. Wnuk et al.; Process for Mounting and Packaging of Fiber Bragg Grating Strain Sensors for Use in Harsh Environment Applications; Smart Structures Conference 2005, SPIE paper 5758-6.

* cited by examiner

Primary Examiner — Ellen Kim

(57) ABSTRACT

A fiber Bragg grating (FBG) based sensor is used as a strain sensing element to determine frame foot loading of a generator. Three FBGs may be used in tandem to form a basic Frame Foot Loading Module (FFL Module). Two modules are fixed on each vertical support gusset at the corner of the generator frame, with one module on the front of the gusset and a second module on the back of the gusset. Thus, each gusset may be instrumented with six FBG strain gauges or sensors. The gussets are chosen on each of the four corners of the generator. For two-pole generators the first three gussets at each corner may be used and, for four-pole generators the first four gussets may be used.

20 Claims, 7 Drawing Sheets

FRAME FOOT LOADING MEASUREMENT SYSTEM USING FIBER OPTIC SENSING TECHNIQUE

FIELD OF THE INVENTION

The present invention relates to the field of generators and, more particularly, to monitoring frame foot loading of turbine powered generators.

BACKGROUND OF THE INVENTION

A turbine powered generator, or turbo-generator, for energy conversion includes a frame structure that is typically installed over a concrete foundation that provides the needed structural support for the generator. There are usually one or more feet along portions of the frame that help transfer the load of the generator frame to the foundation. The weight supported by the generator feet is typically transmitted to the foundation through a shim pack, seating plate and grouting. Varying the shim pack thickness permits alignment between the generator and the turbine during erection and maintenance. The seating plate, grouted to the foundation during erection, provides a solid base of support for the generator. Frame feet that may extend the full length of the frame are typically loaded uniformly, using shim packs whose uniform thickness is modified only to obtain final alignment of the generator to the turbine. Thus, the stator core weight and electrical load are carried by the central portion of the generator while the frame ends support the rotor in the bearings.

To minimize the generator shaft bearing span and to increase stiffness, the rotor bearings can be supported by respective brackets on each end of the frame structure, instead of being supported by external bearing pedestals. This arrangement of the bearings means that the frame feet at the ends of the generator should provide solid support for the rotor shaft and bearings. In the past, electro-mechanical strain gauges have been used on frame ribs, or gussets, to measure load distribution on each foot and to optimize the foot's position for dynamic bearing loads. A load distribution pattern based on frame deflection is used for proper frame foot loading. In particular, one or more electro-mechanical strain gauges have been used on one or more gussets that are located near the corners of the frame structure; it is these vertical support gussets that bear the frame weight at the corners.

The use of electro-mechanical strain gauges in the manner described above introduces some reliability and operational constraints. First, the standard electro-mechanical strain gauges are typically bonded to the gusset substrate via a hydroscopic cement, that can sometimes fail. Even when care is taken to coat the strain gauges with a sealant to keep moisture out, the bond life of the cement can be as brief as 12-18 months. Thus, generators that have been frame foot loaded in the past will need to have the old strain gauges removed and new strain gauges installed for future frame foot loading.

Also, the installation of standard electro-mechanical strain gauges is time consuming even for an experienced technician. A standard strain gauge installation by experienced field personnel is estimated to be about 1 hour for each strain gauge. Thus, by way of example, a typical installation for a four-pole generator may include up to 64 strain gauges to properly instrument the gussets and can therefore require significant installation time.

Also, by design, each standard strain gauge typically requires 3 wires for measurement. For a four-pole generator, as many as 256 wires may need to be routed from the generator to the strain gauge analog connectors. These connections also introduce a large amount of time needed for making final measurements.

Thus, there remains the need to perform frame foot loading measurements for a power generator in a fast, efficient and accurate manner and in a way that ensures reliable results for long periods of time.

SUMMARY OF THE INVENTION

Aspects of the present invention relate to a strain measuring module that is based on fiber Bragg grating sensors. The module includes an optical signal path having a first end and a second end with a first fiber Bragg grating in the optical signal path between the first end and the second end, and a second fiber Bragg grating in the optical signal path between the first fiber Bragg grating and the second end. The module also includes a housing configured to substantially enclose the first and second fiber Bragg gratings; wherein the housing has an outer surface configured to be mechanically attached to a surface of a support gusset of a generator. Further, a temperature sensor may be provided located proximate to the first and second fiber Bragg gratings.

In accordance with an additional aspect of the invention, a strain measuring device is provided comprising a plurality of modules. Each of the modules comprises an optical signal path having a first end and a second end, and at least one fiber Bragg grating in the optical signal path between the first end and the second end. Each module additionally includes a housing configured to substantially enclose the at least one fiber Bragg grating; wherein the housing has an outer surface configured to be mechanically attached to a surface of a support gusset of a generator. The plurality of modules are arranged in a sequential chain of adjacent modules having a beginning module and an ending module to provide a single optical signal path. A light source is coupled with the first end of the beginning module and is configured to provide an incoming spectrum of light. A detector is coupled with the first end of the beginning module and is configured to receive a respective reflected signal from each of the plurality of modules corresponding to the respective Bragg gratings. A jumper fiber is configured to optically couple the second end of each of the plurality of modules to the first end of its respective neighbor in the sequential chain, starting at the beginning module and stopping at the ending module.

Yet another aspect of the present invention relates to a method of determining frame foot loading of a generator including a generator casing supported on a plurality of frame feet and including gussets extending between the generator casing and the frame feet. The method includes attaching at least one frame foot loading module to each of a plurality of the gussets, the plurality of modules being arranged in a sequential chain of adjacent modules having a beginning module and an ending module to provide a single optical signal path. Each of the modules comprises an optical signal path having an individual first end and a second end; at least one fiber Bragg grating in the optical signal path between the first end and the second end; and a housing configured to substantially enclose the at least one fiber Bragg grating; wherein the housing has an outer surface configured to be mechanically attached to a surface of a support gusset of a generator. The method additionally comprises coupling a light source with the first end of the beginning module, the light source being configured to provide an incoming spectrum of light; coupling a detector with the first end of the beginning module, the detector being configured to receive a respective reflected signal from each of the plurality of modules corresponding the a respective Bragg grating; and attaching a jumper fiber to optically couple the second end of each of the plurality of modules to the first end of its respective neighbor in the sequential chain, starting at the beginning module and stopping at the ending module.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

In accordance with aspects of the present invention a fiber Bragg grating (FBG) based sensor is used as a strain sensing element to determine frame foot loading of a generator, such as a turbo-generator. Three FBGs may be used in tandem to form a basic Frame Foot Loading Module (FFL Module). However, it should be understood that the FFL Module may comprise a single FBG. Two modules may be fixed on each vertical support gusset at the corner of the generator frame, with one module on the front of the gusset and a second module on the back of the gusset. Thus, each gusset may be instrumented with six FBG sensors. The gussets are chosen on each of the four corners of the generator. For two-pole generators, the first three gussets at each corner may be used and, for four-pole generators, the first four gussets may be used.

Figure 1:
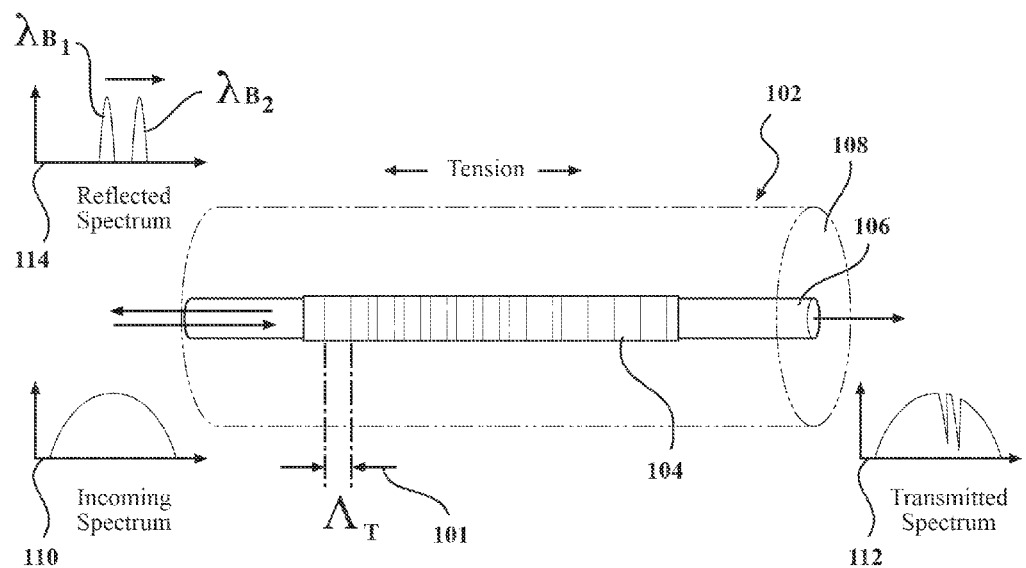
FIG. 1 is a conceptual view of a fiber Bragg grating that can be used as a strain gauge in accordance with the principles of the present invention.

FIG. 1 is a conceptual view of a fiber Bragg grating that can be used as a strain gauge or sensor in accordance with the principles of the present invention. A fiber Bragg grating (FBG) 104 is typically formed in the core 106 of an optical fiber 102. The core 106 is surrounded by cladding 108 as shown in FIG. 1. These gratings are passive optical devices that can be monitored by detecting a signal reflected from the FBG 104 or a signal transmitted through the FBG 104. The Bragg wavelength $\lambda_B$, also known as the central wavelength, of the grating 104 is determined by:

$$\lambda_B = 2n_e \Lambda_T$$

where $n_e$ is the effective refractive index of the grating 104 in the fiber core 106 and $\Lambda_T$ 101 is the grating period. The effective refractive index quantifies the velocity of propagating light through the core 106 as compared to its velocity in vacuum. A physical property associated with an environment of the grating 104 that can be measured is referred to herein as a measurand and example measurands include temperature, strain, pressure, tension, humidity, etc. As the measurand changes, the grating period 101 also changes which allows the grating 104 to indicate this change of the measurand in its local environment.

In practice, light having a broadband spectrum 110 is coupled as an input to the optical fiber 102 and the grating 104 reflects a portion of the broadband input light 110. The center wavelength of the reflected light 114 is determined by each fiber Bragg grating and each is unique wherein $\lambda_{B1}$, $\lambda_{B2}$ may be representative of a plurality of reflected center wavelengths. When a measurand affects the grating 104, the result is that the central wavelength of light reflected by the grating shifts. This spectral shift can be considered as a direct measurement of the measurand.

Further, as is also depicted in FIG. 1, the portion of the broadband spectrum 110 not reflected at the grating 104 continues past the grating 104 as a transmitted spectrum 112. The transmitted spectrum 112 provides a spectrum of light that may be reflected at one or more subsequent FBGs providing reflected light signals in wavelength ranges centered around different central wavelengths, as is discussed further below.

Figure 2:
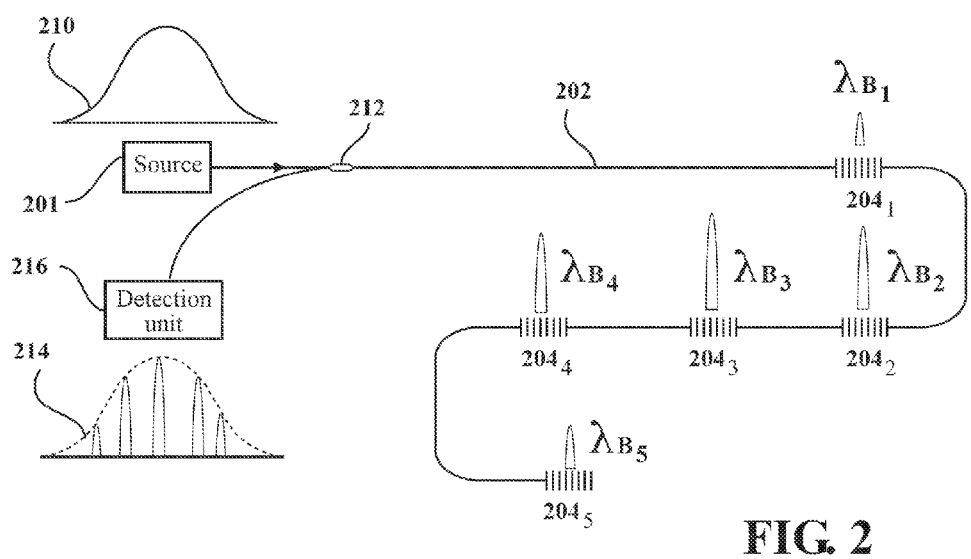
FIG. 2 is a conceptual view of a sensor arrangement of a plurality of fiber Bragg gratings that can be used as a strain gauge arrangement in accordance with the principles of the present invention.

FIG. 2 is a conceptual view of a sensor arrangement of a plurality of fiber Bragg gratings that can be used as a strain gauge arrangement in accordance with the principles of the present invention. Several FBG gratings $204_1$, $204_2$, $204_3$, $204_4$, and $204_5$, each with a respective different center wavelength $\lambda_{B1}$, $\lambda_{B2}$, $\lambda_{B3}$, $\lambda_{B4}$, and $\lambda_{B5}$, can be included in the same fiber 202 chain and measured simultaneously. The basic configuration of such an FBG based sensor may include an illuminating source 201, an optical coupler 212, a detection unit 216, and the different FBGs, i.e., $204_1$-$204_5$. Light 210 from the source 208 is reflected from each FBG and the coupler 208 passes this reflected light to the detection unit 216. Shifts of the Bragg wavelength are translated to changes in the measurand. In particular, a reflection spectrum 214 of the reflected light includes a respective reflected signal from each of the FBGs $204_1$-$204_5$ with the respective reflected signal depending on the respective Bragg wavelengths $\lambda_1$ through $\lambda_5$ of the FBGs, $204_1$-$204_5$. By knowing the Bragg wavelength of a grating at a known measurand value, the observed shift of that wavelength can be used to determine a change in that measurand value.

As shown in FIG. 2, the shift in wavelength of a plurality of FBGs $204_1$-$204_5$ can be simultaneously detected and individual shifts of the Bragg wavelength will respectively indicate changes in the measurand at the specific location occupied by that Bragg grating. The number of FBGs that can be incorporated within a single fiber 202 depends on the wavelength range of operation of each FBG and the total available wavelength range of the detection unit 216. Because wavelength shifts due to strain are typically more pronounced than temperature, FBG strain sensors are often given a ~5 nm range, while FBG temperature sensors are allotted ~1 nm. Because typical detectors may provide a measurement range of about 50 to 100 nm, each fiber array of sensors can usually incorporate anywhere from one to more than 80 FBG sensors—as long as the reflected wavelengths do not overlap in the optical spectrum. The broadband source 201 can include a light source producing a spectrum 210 with wavelengths of between 1500 nm to 1600 nm with a center wavelength $\lambda_0$ of about 1550 nm. One of ordinary skill will recognize that other broadband light sources, other operating wavelengths and more or fewer FBGs can be used without departing from the scope of the present invention.

Thus, in FIG. 2, the gratings $204_1$-$204_5$ are chosen so that their reflected spectrum is within the spectral band of the light spectrum 210 provided by the light source 201. The Bragg gratings have non-overlapping spectral reflection characteristics 214 so that each is identifiable at the detection unit 216 by its own spectral band. The reflected Bragg signal from each FBG sensor is monitored in reflection by the detection system 216. Any shift in the Bragg wavelength will indicate a change in the measurand at the corresponding FBG sensor location.

Figure 3:
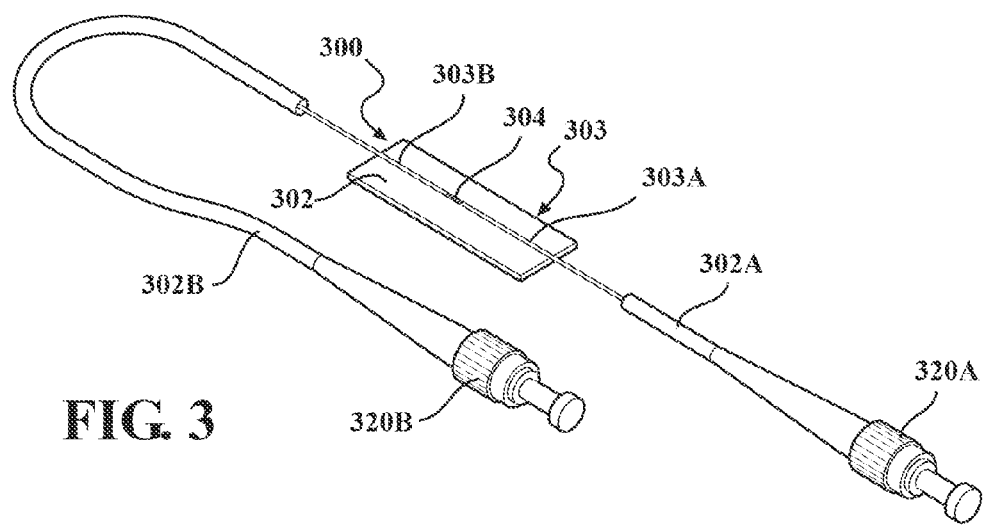
FIG. 3 depicts a weldable fiber Bragg grating component in accordance with the principles of the present invention.

In accordance with aspects of the present invention, the FBG strain sensor may be located on the vertical support gussets of a generator, such as a turbo-generator. At this location, the sensor, along with a plurality of other similar sensors, can be used to detect strain information beneficial for determining frame foot loading parameters of the generator. Thus, according to this aspect of the invention, the FBG sensor is mechanically coupled with a surface of a gusset so that strain on the surface of the gusset can cause resulting strain of the FBG strain sensor, which can then be detected and measured. FIG. 3 depicts a weldable fiber Bragg grating component 300 in accordance with the principles of the present invention.

The weldable FBG component 300 of FIG. 3 may include a pre-stretched or pre-tensioned optical fiber 302, incorporating a FBG 304, which is attached to a weldable plate 303. The weldable plate 303 provides a relatively flat, smooth surface that simplifies bonding of the fiber 302 to an appropriate surface. The plate 303 can be anchored to the surface by epoxy, cement or other adhesives. However, one beneficial method is to construct the plate 303 out of a metal that can be welded to a surface where strain is to be measured. For example, the plate 303 may be spot welded to an underlying substrate surface. A weld may provide a more reliable attachment over time as compared to epoxy or cement.

The fiber 302 is typically anchored to opposite ends 303A, 303B of the weldable plate 303 with a respective fiber extension 302A and 302B extending from each such anchoring point. The fiber extensions 302A, 302B can each have a respective connector or optical coupler 320A and 320B that allows the FBG component 300 to be easily inserted within as a portion of a multicomponent fiber assembly.

The FBG strain sensor of FIG. 3 is merely an example of one way that such a sensor can be constructed to provide a strain sensor that can be attached to a surface of an object. One of ordinary skill will recognize that there are other, functionally equivalent methods of constructing FBG strain sensors without departing from the scope of the present invention.

Figure 4A:
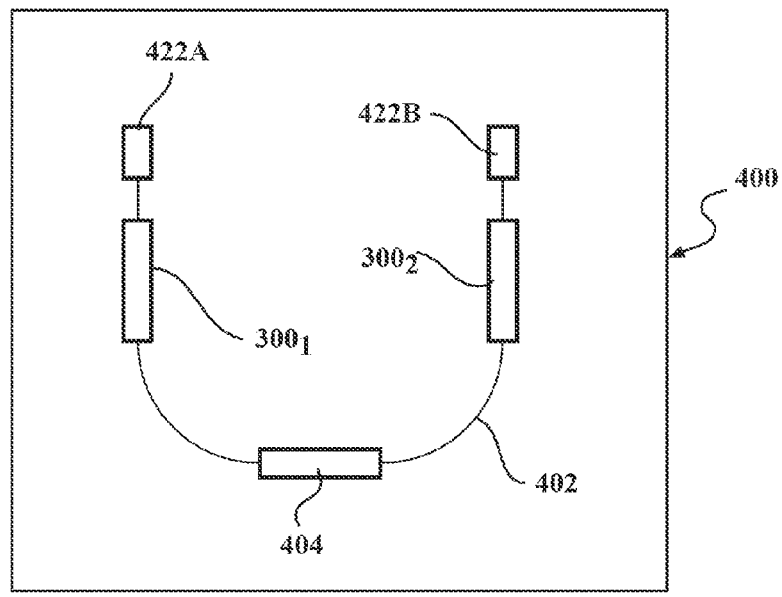
FIGS. 4A-C depict a plurality of fiber Bragg gratings arranged in a module in accordance with the principles of the present invention.
Figure 4B:
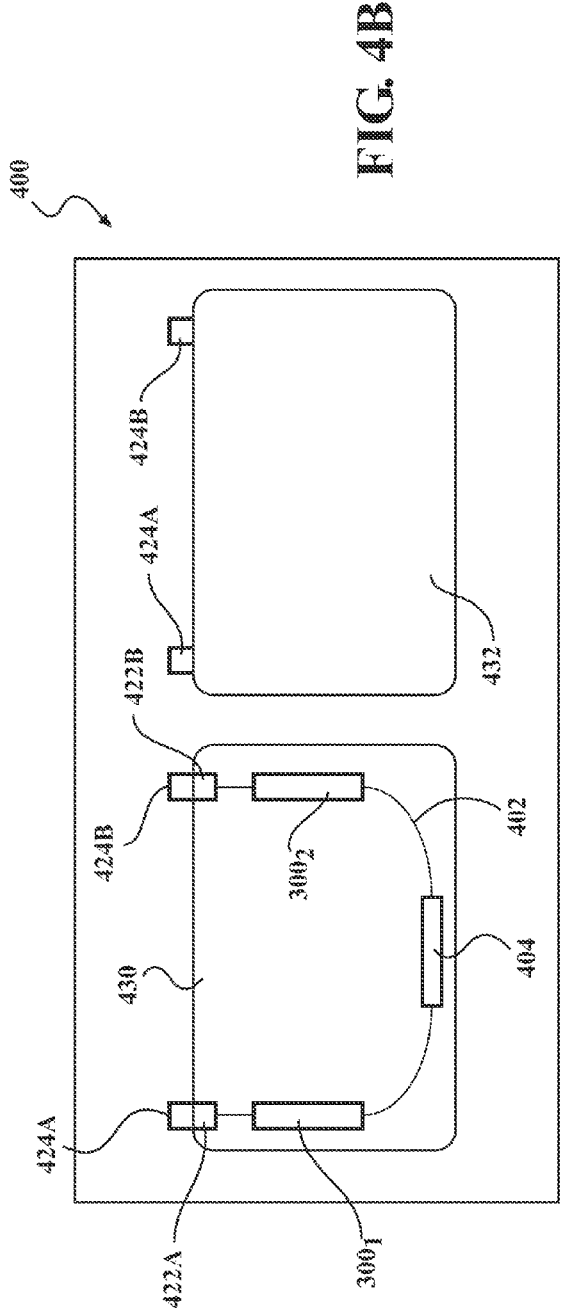
Figure 4C:
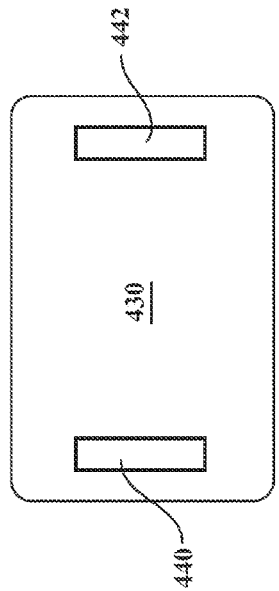

FIGS. 4A-C depict a module or modular construction 400 that may be configured with one or more fiber Bragg gratings in accordance with the principles of the present invention. The module 400 of FIGS. 4A-4C can be referred to as a frame foot loading (FFL) module. The arrangement of FIG. 4A includes a fiber chain that may include a first FBG strain sensor $300_1$ (on the left) and a second FBG strain sensor $300_2$ (on the right). The strain sensors $300_1$, $300_2$ may be constructed similar to the component 300 described above and, as such, may each include a weldable plate, such as plate 303 described above. The module 400 may also include an FBG temperature sensor 404 located in between the two strain sensors $300_1$, $300_2$. The structure of a FBG temperature sensor and a FBG strain sensor is substantially the same with the exception that the weldable plate 303 need not be included for the FBG temperature sensor 404. In each instance the grating period of each of the FBGs change as a result of a change in a measurand. In particular, for the FBG temperature sensor 404, the effective refractive index, $n_e$, of the temperature sensor FBG changes as a result of temperature change of the fiber 402 thereby shifting the Bragg wavelength.

While there may be couplings and connectors (not shown) between the different FBG sensors $300_1$, $300_2$, 404, the effect is that the fiber 402 is effectively a continuous optical fiber path between terminal optical couplers or connectors 422A and 422B for the module 400.

FIG. 4B depicts the FBG sensor arrangement from FIG. 4A attached to a protective housing or casing for the module 400. The casing can include a bottom plate 430 and a cover plate 432 that provide an enclosure for the FBG sensor arrangement of FIG. 4A. The terminal connectors 422A, 422B can each be coupled with a respective external connector 424A, 424B. In this way, the module 400 of FIGS. 4B and 4C can be a stand-alone strain sensor module that may include one or more FBG sensors. In particular, as described herein, the module 400 can be a stand-alone strain sensor module including a plurality of FBG strain sensors, e.g., two FBG strain sensors, and that may include an FBG temperature sensor, as well as connectivity points for receiving and transmitting optical signals.

FIG. 4C depicts one particular feature of the bottom plate 430. It is envisioned that the bottom plate 430 will be attached in some manner to the frame gusset and that the inside of the module 400 will be accessible by removing the cover plate 432. However, attaching the FBG strain sensors $300_1$, $300_2$ to the bottom plate 430 may not accurately detect the strain being experienced by the gusset. Thus, respective openings 440, 442 are provided in the bottom plate 430. These openings allow the respective weldable plates 303 associated with each FBG strain sensor $300_1$, $300_2$ to be welded directly to the surface of the gusset without any interference from the bottom plate 430. The openings 440, 442 are sized appropriately based on the weldable plate 303 size and, as for spacing, the openings 440, 442 can be separated by a distance of between about 4 inches to about 7 inches. As a result, the module 400, when attached to the surface of the gusset, will provide two different measurements of strain experienced by that gusset surface as well as an indication of the temperature where those FBG strain sensors $300_1$, $300_2$ are located.

The FBG temperature sensor 404 can be securely located within the module by the fibers connecting the temperature sensor 404 with the FBG strain sensors $300_1$ and $300_2$. Thus, the temperature sensor 404 can avoid being affected by the stress or strain of being rigidly mounted to a fixed surface. As mentioned, the FBG temperature sensor 404 provides a way to measure temperature near the location of the FBG strain sensors $300_1$ and $300_2$. However, one of ordinary skill will recognize that a different type of temperature sensor may be provided as well. For example, a wireless network of identifiable, semiconductor-based, temperature sensors would allow temperature to be sensed at different locations where the module 400 may be located.

One of ordinary skill will recognize that additional FBG strain sensors can be included in the module 400 without departing from the scope of the present invention. For example, a third FBG strain sensor could be located between the FBG temperature sensor 404 and the FBG strain sensor $300_2$. In this arrangement, the breadth of the module 400 can be extended to the right to accommodate the additional sensor. In such an arrangement, the fiber 402 can be formed in a serpentine configuration so that all three of the FBG strain sensors are substantially vertically aligned within the extended module.

Figure 5A:
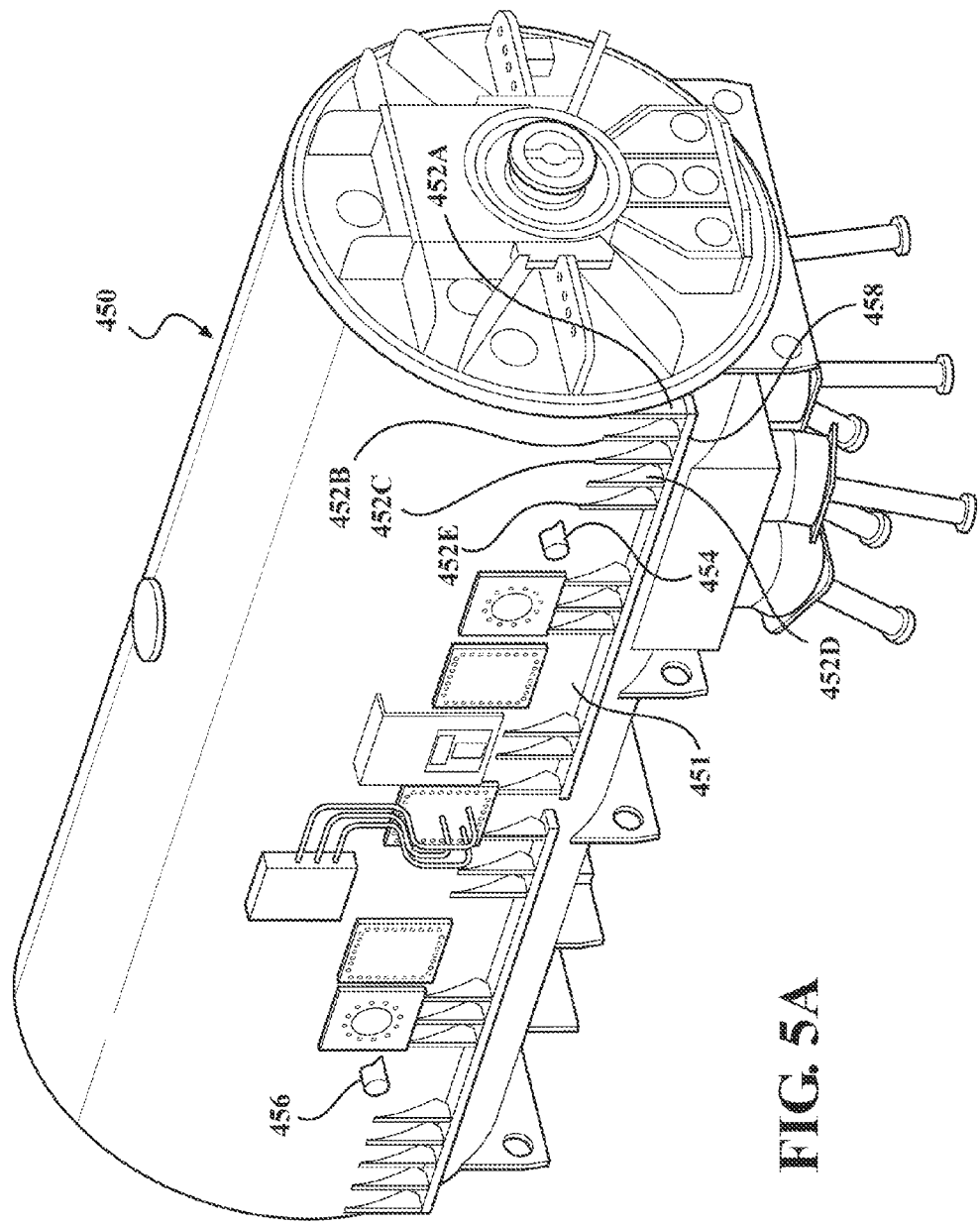
FIGS. 5A and 5B are each a perspective view of different areas of a turbo generator.
Figure 5B:
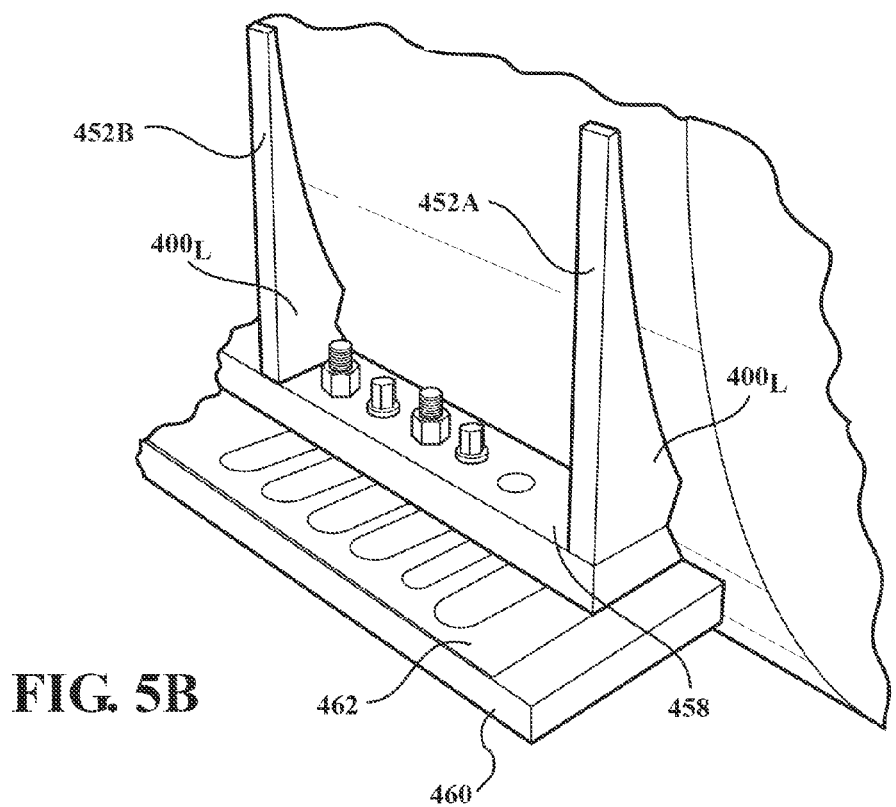

FIGS. 5A and 5B are each a perspective view of different areas of a turbo-generator. In FIG. 5A one side of a generator 450 is shown that shows the gussets near each end of that side of the generator 450; similar gussets are located on the other side of the generator 450 as well. The gussets of the front right corner of the generator 450 include first through fifth gussets 452A-E. These gussets 452A-E are coupled with a casing 451 of the generator 450 and with the frame foot 458 and, thus, strain on the gussets is indicative of the frame foot loading experienced by the generator 450. Typically, strain on the first four of the gussets 452A-D may be determined. Also shown in FIG. 5A is one or more trunnions 454, 456. Using these trunnions and a hydraulic jack, or similar means, a corner of the generator 450 can be lifted so that the foot frame 458 does not sit on any supporting foundation. In this way, a baseline strain experienced by the gusset surfaces 452A-D can be determined when there is no load on the frame foot at that corner.

FIG. 5B shows a detailed view of the frame foot 458 that sits on a seating plate 460. The first and second gussets 452A and 452B are illustrated with location, $400_L$ for respective modules labeled for reference. Shims 462 are inserted between the seating plate 460 and the frame foot 458 to adjust the frame foot loading pattern experienced by the gussets.

Figure 6:
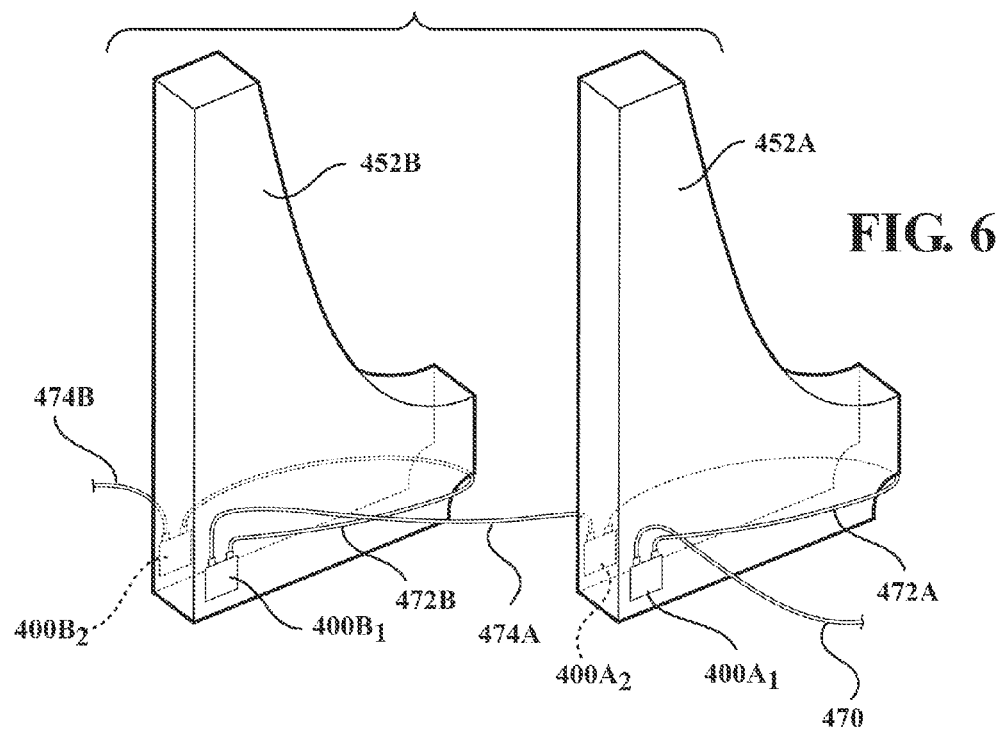
FIG. 6 depicts two gussets having frame foot loading modules in accordance with the principles of the present invention.

FIG. 6 depicts the first two gussets 452A, 452B having frame foot loading modules in accordance with the principles of the present invention. One beneficial technique for acquiring frame foot loading information is to place multiple modules 400 on each of the gussets 452A-D. For example, on the first gusset 452A, a FBG strain sensor module $400A_1$ is placed on a front side of the gusset 452A and a corresponding module $400A_2$ is placed on a back side of the gusset 452A. The terms "front" and "back" are used for convenience to denote opposite sides of the gusset are not intended to limit embodiments of the present invention to only specific spatial arrangements.

Similarly, a second pair of modules $400B_1$ and $400B_2$ are attached to the second gusset 452B. Thus, each gusset 452A, 452B has two FBG strain sensor modules so that each gusset 452A, 452B includes 4 FBG strain sensors and 2 FBG temperature sensors. The modules $400A_1$, $400A_2$, $400B_1$, $400B_2$ may be placed in similar locations on each respective gusset surface so that misplacement of the modules does not introduce unintended differences in the measurands. In particular, each module can be placed about 3 to 7 inches from the outside edge of a respective gusset and about 3 to 7 inches above the frame foot.

An optical fiber 470 can connect the first module $400A_1$ to a source/detector, e.g., a source 201/detection unit 216 depicted in FIG. 2, and a jumper fiber 472A can connect the first module $400A_1$ to the second module $400A_2$. Another jumper fiber 474A can connect the second module $400A_2$ to the first module $400B_1$ on the second gusset 452B, and a further jumper fiber 472B can connect the first module $400B_1$ to the second module $400B_2$. An additional optical fiber 474B can be used to extend the fiber chain to additional modules.

Figure 7:
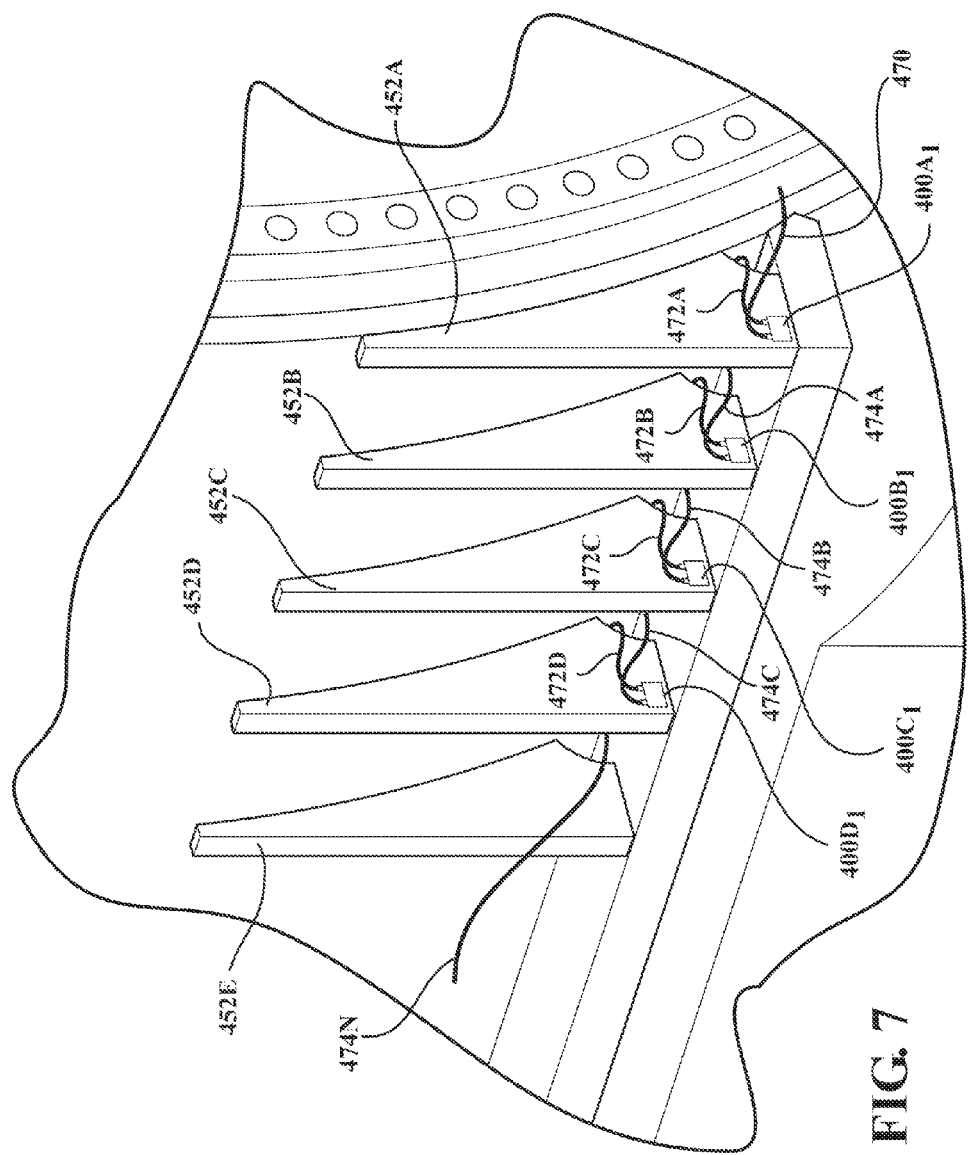
FIG. 7 depicts a corner of a generator frame with a plurality of gussets and frame foot loading modules in accordance with the principles of the present invention.

FIG. 7 depicts a corner of a generator frame with a plurality of gussets 452A, 452B, 452C, 452D supporting respective frame foot loading modules in accordance with the principles of the present invention. In FIG. 7, each of four different modules $400A_1$, $400B_1$, $400C_1$, $400D_1$ are shown attached to respective gussets. Each of these four different modules has a corresponding module, which is not visible, on the opposite side of their respective gusset, such that there are 8 modules on the generator corner of FIG. 7. Also, there are three other corners not shown in FIG. 7 that may have a similar arrangement of modules on the respective gussets of those corners. Thus, the generator of FIG. 7 may have, for example, 32 modules in total to help determine frame foot loading parameters.

As mentioned previously, there are instances where modules may be attached to only three gussets at each corner of the generator. One of ordinary skill will recognize that more than 4 gussets may have attached modules, as well, without departing from the scope of the present invention.

As described above, the modules on one side of a gusset are coupled with the module on the corresponding opposite side by a corresponding jumper fiber 472A-D. Also, there are jumper fibers 474A-C which represents the coupling between a module from one gusset to a module on another gusset. These jumper fibers 472A-D and 474A-C are used when strain (and temperature) measurements of the different modules are being acquired. Before operation of the generator, after frame foot loading has been adjusted, these jumper fibers 472A-D and 474A-C may be removed. One benefit is that the modules $400A_1$-$D_1$, and associated opposite modules, can be left in place so that if the frame foot loading needs to be recalculated at some future time, the only connections needed are to add the jumper fibers, substantially reducing the complexity and connection time over prior measurement systems.

As mentioned earlier, multiple FBG strain sensors can be coupled together in series and all analyzed at once. Thus, the signals from the 8 modules coupled to the corner gussets shown in FIG. 7 could all be analyzed contemporaneously. When a different corner is to be analyzed, then connections to those 8 modules can be put into place and those signals analyzed. However, in addition to each corner being analyzed separately, a jumper fiber may be used to couple a "last" module from one corner to a "first" module of a second corner of the generator as may be represented by the jumper fiber 474N. In this way, all the corners (or just some of the corners) of the generator can be linked together so that signals from all the corners could be acquired and analyzed in a contemporaneous manner.

Figure 8:
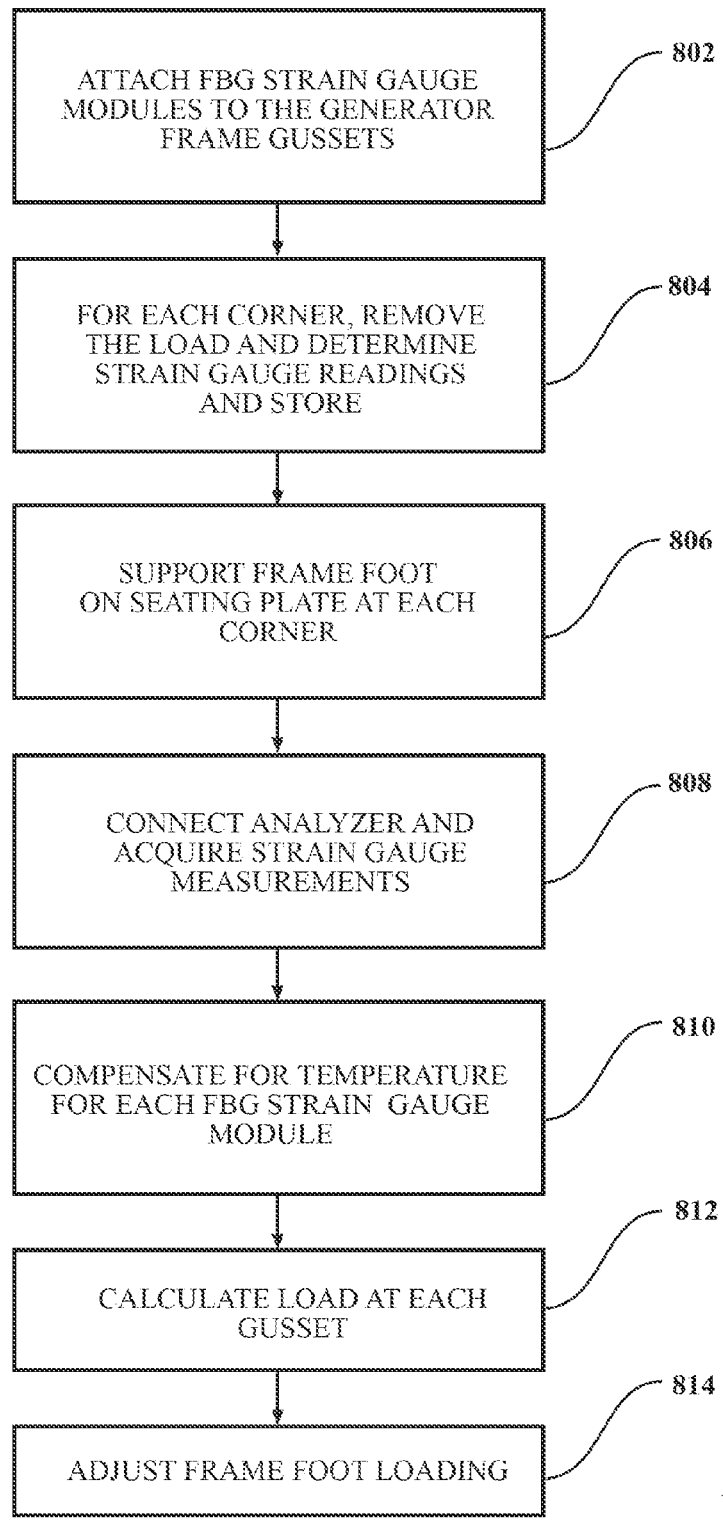
FIG. 8 is a flowchart of an exemplary method of sensing frame foot loading patterns in accordance with the principles of the present invention.

FIG. 8 is a flowchart of an exemplary method of sensing frame foot loading patterns in accordance with the principles of the present invention. In a first step, 802, the plurality of FBG strain gauge modules (i.e., the FFL modules) are attached to appropriate locations on gussets at one or more corners of a generator. The FFL modules are also linked together by appropriate jumper fibers to create an optical signal path that includes multiple FBG strain sensors. The optical signal path may also include multiple FBG temperature sensors.

In step 804, the baseline measurements of the FBG strain gauges are determined. In particular, the corner of the generator can be lifted so that any load can be removed from the frame foot (and the support gussets) at a generator's corner. Each FBG may still experience some tension or strain, even when no load is placed at the frame foot. For example, a typical FBG 302, as shown in FIG. 3, is prestretched before being anchored to the weldable plate 303. Also, the welding of the plate 303 to a gusset surface may also add additional strain on the FBG 302. Thus, in step 804, the baseline Bragg wavelength of each FBG strain sensor is determined in its installed condition on a gusset under no load.

If a FBG temperature sensor is utilized, as depicted in FIGS. 4A-4C, then a calibration step may be performed so that the Bragg wavelength of each temperature sensor at a known temperature can be calculated. In particular, the calibration of the FBG temperature sensor can be performed at the same time the no-load strain measurements are determined in step 804.

For determining the baseline strain measurements and the temperature calibration measurements, a signal source and detector are coupled with the string of FFL modules and the reflected signals are used to determine a baseline, or calibration, Bragg wavelength for each FBG in the string of FFL modules.

In step 806, the frame feet of the generator are attached, or re-attached, to their respective seating plates. As described above, a signal analyzer having a signal source and detector can be coupled with the string of FFL modules, in step 808, that provide an optical signal path. As described above, the signal source transmits a broadband signal that causes a respective reflected signal from each FBG in the optical signal path. Each of the reflected signals may be shifted as a result of the strain or temperature differences as compared to the baseline Bragg wavelength for a respective FBG sensor.

Thus, in step 810, the reflected signal for a FBG temperature sensor can be used to determine a compensation factor to be used when evaluating a strain measurement for a particular FBG strain sensor. For example, for one FFL module, there may be two FBG strain sensors and a nearby FBG temperature sensor. Each strain sensor will experience a respective Bragg wavelength shift due to the strain experienced by the gusset surface to which they are attached. The FBG strain sensors will also experience a Bragg wavelength shift due to any ambient temperature differences between their current environment and the environment when the baseline strain readings were determined. Thus, the FBG temperature sensor indicates an amount of Bragg wavelength shift that results from temperature differences and this shift can be used to compensate, in step 810, the measurement of the reflected signal from each FBG strain gauges so that the Bragg wavelength shift due solely to strain can be determined. Thus, in step 812, the load at each gusset, and frame foot, can be calculated accurately under a variety of temperature conditions. Based on the frame foot loading pattern that is calculated, shims and other techniques can be used to adjust, in step 814, the frame foot loading to a desired pattern.

As described above, the jumper fibers between adjacent gussets, and between corners of the generator, may be removed at their respective couplings with the modules before placing the generator in operation. Further, the jumper fibers may be re-attached in a timely and efficient manner, requiring a relatively few connections, to again perform the steps described in FIG. 8 at a later time.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A strain measuring device comprising:
    an optical signal path having a first end and a second end;
    a strain module comprising:
        a first fiber Bragg grating in the optical signal path between the first end and the second end; and
        a second fiber Bragg grating in the optical signal path between the first fiber Bragg grating and the second end; and
    a housing configured to substantially enclose the strain module; wherein the housing has an outer surface configured to be mechanically attached to a surface of a support gusset of a generator.

2. The device of claim 1, wherein the housing includes a cover plate and a bottom plate and an outside surface of the bottom plate corresponds to the outer surface configured to be mechanically attached to the surface of the support gusset of the generator, and the bottom plate includes a first and second opening that expose an inside of the housing to the surface of the support gusset.

3. The device of claim 2, wherein:
    the first fiber Bragg grating comprises a first optical fiber anchored to a first weldable plate;
    the second fiber grating comprises a second optical fiber anchored to a second weldable plate;
    and wherein the first opening is configured to accommodate the first weldable plate to allow the first weldable plate to contact the surface of the support gusset at a first location and the second opening is configured to accommodate the second weldable plate to allow the second weldable plate to contact the surface of the support gusset at a second location.

4. The device of claim 1, wherein:
    the first end includes a first optical connector configured to be coupled with a first jumper fiber; and
    the second end includes a second optical connector configured to be coupled with a second jumper fiber.

5. The device of claim 1, wherein the strain module further comprises a temperature sensor located proximate to the first and second fiber Bragg gratings.

6. The device of claim 5, wherein the temperature sensor comprises a third fiber Bragg grating.

7. The device of claim 6, wherein the third fiber Bragg grating is included in the optical signal path.

8. The device of claim 7, wherein the third fiber Bragg grating is located between the first fiber Bragg grating and the second fiber Bragg grating.

9. The device of claim 7, wherein each respective Bragg wavelength of the first, second, and third fiber Bragg gratings are different.

10. A strain measuring device comprising:
    a plurality of modules, each module comprising:
        an optical signal path having a first end and a second end;
        at least one fiber Bragg grating in the optical signal path between the first end and the second end; and
        a housing configured to substantially enclose the at least one fiber Bragg grating; wherein the housing has an outer surface configured to be mechanically attached to a surface of a support gusset of a generator;
    wherein the plurality of modules are arranged in a sequential chain of adjacent modules having a beginning module and an ending module to provide a single optical signal path;
    a light source coupled with the first end of the beginning module and configured to provide an incoming spectrum of light;
    a detector coupled with the first end of the beginning module and configured to receive a respective reflected signal from each of the plurality of modules corresponding the respective Bragg gratings; and
    a jumper fiber configured to optically couple the second end of each of the plurality of modules to the first end of its respective neighbor in the sequential chain, starting at the beginning module and stopping at the ending module.

11. The device of claim 10, wherein the plurality of modules are logically grouped together as pairs of modules such that for a particular pair of modules a first module of the pair is configured to be attached to a first side of a respective gusset and the second module of the pair is configured to be attached to the second side of the respective gusset.

12. The device of claim 11, wherein the at least one fiber Bragg grating comprises a first fiber Bragg grating, and and each of the plurality of modules further comprise:
a second fiber Bragg grating in the optical signal path between the first fiber Bragg grating and the second end; and
a temperature sensor located proximate to the first and second fiber Bragg gratings.

13. The device of claim 12, wherein for each of the plurality of modules:
the housing includes a cover plate and a bottom plate and an outside surface of the bottom plate corresponds to the outer surface configured to be mechanically attached to the surface of the support gusset of the generator, and the bottom plate includes a first and second opening that expose an inside of the housing to the surface of the support gusset, wherein:
the first fiber Bragg grating comprises a first optical fiber anchored to a first weldable plate;
the second fiber Bragg grating comprises a second optical fiber anchored to a second weldable plate;
and wherein the first opening is configured to accommodate the first weldable plate to allow the first weldable plate to contact the surface of the support gusset at a first location and the second opening is configured to accommodate the second weldable plate to allow the second weldable plate to contact the surface of the support gusset at a second location.

14. The device of claim 12, wherein for each of the plurality of modules:
the temperature sensor comprises a third fiber Bragg grating included in the optical signal path and located between the first fiber Bragg grating and the second fiber Bragg grating.

15. The device of claim 14, wherein each respective Bragg wavelength of the first, second, and third fiber Bragg gratings are different.

16. A method of determining frame foot loading of a generator including a generator casing supported on a plurality of frame feet and including gussets extending between the generator casing and the frame feet, the method including:
attaching at least one frame foot loading module to each of a plurality of the gussets, the plurality of modules being arranged in a sequential chain of adjacent modules having a beginning module and an ending module to provide a single optical signal path; each module comprising:
an optical signal path having a first end and a second end;
at least one fiber Bragg grating in the optical signal path between the first end and the second end; and
a housing configured to substantially enclose the at least one fiber Bragg grating; wherein the housing has an outer surface configured to be mechanically attached to a surface of a support gusset of a generator;
coupling a light source with the first end of the beginning module, the light source configured to provide an incoming spectrum of light;
coupling a detector with the first end of the beginning module, the detector configured to receive a respective reflected signal from each of the plurality of modules corresponding to the respective at least one fiber Bragg grating of each of the plurality of modules; and
attaching a respective jumper fiber to optically couple the second end of each of the plurality of modules to the first end of its respective neighbor in the sequential chain, starting at the beginning module and stopping at the ending module.

17. The method of claim 16, including determining a frame foot loading for at least one frame foot and removing the jumper fibers prior to operation of the generator.

18. The method of claim 17, including re-attaching the respective jumper fibers between the modules to perform a further determination of a frame foot loading following operation of the generator.

19. The method of claim 16, wherein a plurality of gussets on at least two of the frame feet are provided with the modules, such that all of the modules on the at least two frame feet are connected in the single optical signal path.

20. The method of claim 16, wherein said step of attaching said at least one frame foot loading module to each of a plurality of the gussets includes:
coupling a first frame foot loading module to a first side of a first gusset of the generator;
coupling a second frame foot loading module to a second side of the first gusset of the turbo generator;
optically coupling the first frame foot loading module to the second frame foot loading module;
determining a first temperature compensation factor associated with the first frame foot loading module;
determining a second temperature compensation factor associated with the second frame foot loading module;
detecting a first strain measurement corresponding to the first frame foot loading module;
detecting a second strain measurement corresponding to the second frame foot loading module;
compensating the first strain measurement based on the first temperature compensation factor;
compensating the second strain measurement based on the second temperature compensation factor; and
calculating a frame foot loading pattern based on the compensated first and second strain measurements, wherein the first and second frame foot loading modules each, respectively, comprise:
one of the optical signal paths having a first end and a second end;
a first fiber Bragg grating in the optical signal path between the first end and the second end;
a second fiber Bragg grating in the optical signal path between the first fiber Bragg grating and the second end;
a third fiber Bragg grating comprising a temperature sensor located in the optical signal path proximate to the first and second fiber Bragg gratings; and
a housing configured to substantially enclose the first, second and third fiber Bragg gratings.

* * * * *